Sept. 12, 1967     D. L. OTTO     3,341,264
UNITIZED DUAL LIP SEAL
Filed Sept. 3, 1965
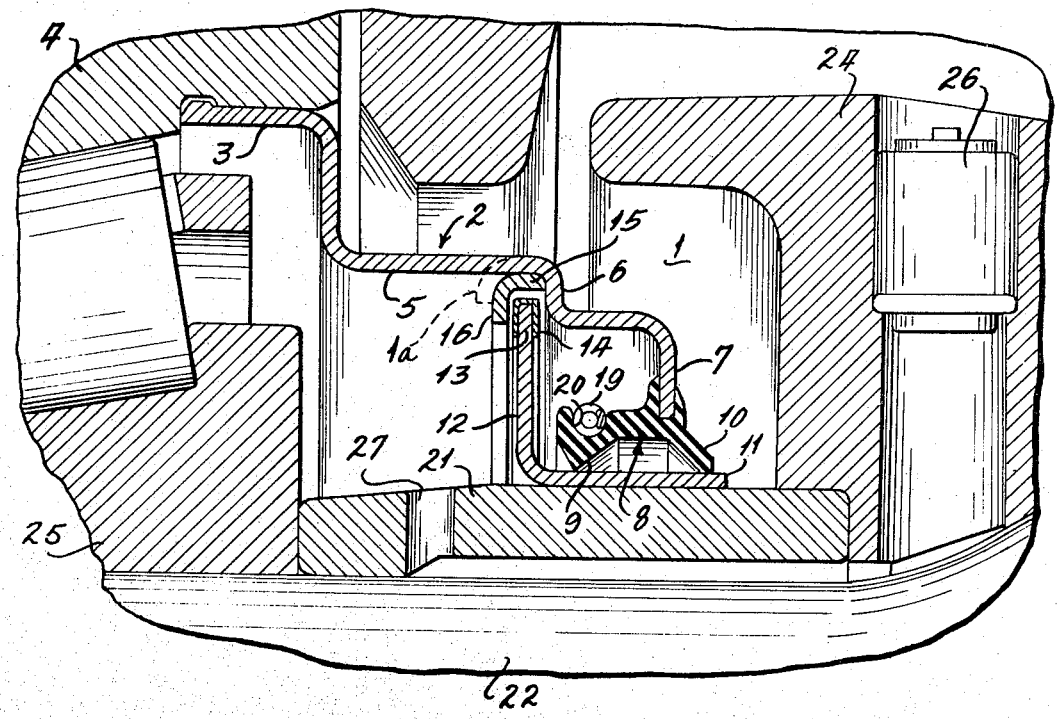
INVENTOR:
DENNIS L. OTTO
BY *Gravely Lieder + Woodruff*
ATTORNEYS.

United States Patent Office 3,341,264
Patented Sept. 12, 1967

3,341,264
UNITIZED DUAL LIP SEAL
Dennis L. Otto, Canton, Ohio, assignor to The Timken Roller Bearing Company, Canton, Ohio, a corporation of Ohio
Filed Sept. 3, 1965, Ser. No. 484,858
8 Claims. (Cl. 308—187.1)

This invention relates to a unitized dual lip seal for rotary shafts, and more particularly to a unitized dual lip seal integrally bonded to a seal case on opposite sides of an inwardly directed radial rim of a seal case, and includes a seal wear ring, as well as a thrust ring for unitizing the dual lip seal.

Various shaft seals, for use in such applications as railway car axle journals, have been proposed with fluid sealing and dust sealing lip arrangements in completely unitized seal construction. However, most such seals require an excessive number of parts and components to achieve the desired results. Many require several metal parts to support and retain the seal lips in a unitized construction. Moreover, the complexity of such seals affects the ability to provide a durable seal which may readily dissipate heat.

The present invention provides a simple and easy method to construct a unitized dual lip seal. Briefly, the invention provides an integral resilient elastomer bonded directly to an inwardly directed radial flange of a seal case, and includes a fluid sealing lip and a dust sealing lip diagonally diverging from opposite sides of the radial flange. The fluid sealing lip and the dust sealing lip seat against a wear ring having a radial portion coated at its periphery with a resilient, low friction material. Moreover, the seal appertaining to the invention contemplates not only the seal wear ring which rotates relative to the seal case, but also a thrust ring which seats against a shoulder of the seal case and extends over the outside of the seal wear ring to unitize the seal member.

It is therefore an object of the invention to provide a unitized dual lip seal including a seal member integrally bonded to a radial flange of the seal case, and having a relatively rotatable wear member which provides a seal wear surface for the dual lip seal.

Another object of the invention is to provide a unitized dual lip seal having an integrally bonded seal member and having a single member for rotating with the shaft to be sealed.

It is another object of the invention to provide a unitized dual lip seal for a railway car axle journal including a seal case having an inwardly directed radial flange and a stepped cylindrical body, including an integral, resilient seal member bonded onto the radial flange of said seal case, including a relatively rotatable member encasing the fluid sealing lip and providing a sealing surface for said fluid sealing lip and dust sealing lip, said rotating member engaging the rotating part of the journal to provide a seal thereto, and including a thrust ring unitizing said dual lip seal.

It is another object of the invention to provide a unitized dual lip seal for a railway car axle journal including a seal case, a seal member bonded to a radial flange of said seal case having an integral fluid sealing lip and an integral dust sealing lip diagonally diverging from opposite sides of said radial flange, a rotary member encasing said fluid seal lip, and a thrust ring for unitizing the seal.

These and other objects and advantages of the invention will become apparent from the ensuing description taken in conjunction with the sole figure which illustrates a partial cross section of the unitized dual lip seal in a railway car journal application.

Referring to the sole figure, the unitized dual lip seal 1 includes a seal case 2 seated by a cylindrical flange 3 of the seal case 2 against the internal surface of a bearing cup 4 in the bearing assembly of a railway car axle journal. The seal case 2 includes a cylindrical body 5 having a central shoulder 6 terminating in a radial directed flange 7. A resilient seal member 8 having a fluid sealing lip 9 and a dust sealing lip 10 is bonded over the edge of radial flange 7. The fluid sealing lip 9 and the dust sealing lip 10 are molded as diagonally diverging flanges of seal member 8. The fluid lip 9 and dust lip 10 ride on the surface of a wear ring 11 having a radial flange 12 which extends spaced axially adjacent central shoulder 6 of the cylindrical body 5. The peripheral portion 13 of the radial flange 12 is coated with a low friction material 14 such as polytetrafluoroethylene. A thrust ring 15 nests in seal case 2 against shoulder 6. The thrust ring 15 has a radial ring 16 which retains the flange 12 of wear ring 11 between shoulder 6 and the radial rim 16 with sufficient clearance to permit free rotation of the wear ring 11. A garter spring 19 is positioned in a depression 20 formed in the backside of the sealing edge of fluid sealing lip 9 to maintain good sealing pressure between the fluid sealing lip 9 and the seal wear ring 11.

In the particular railway car journal application of the unitized dual lip seal as illustrated in the sole figure, a wear ring 11 is press fitted onto a spacer ring 21 which is press fitted to axle 22 of the railway car journal and is positioned between backing ring 24 and cone 25 in the bearing assembly of the axle journal. Backing ring 24 includes a vent fitting 26. A vent passageway is provided from vent fitting 26 into the seal case 3 along axle 22 and through the port 27 in the spacer ring 21. Although the wear ring 11 is illustrated as press fitted onto spacer ring 21, it will be appreciated that in other type applications, the wear ring 11 could be seated directly to the axle or shaft to be sealed. In either event good heat dissipation would be provided. Moreover, where heat dissipation through the wear ring 11 and spacer ring 21 to the axle 22 or through the wear ring 11 directly to the axle is not essential, a rubber coating on the mating surface of the wear ring 11 could be provided to seal the wear ring to the spacer ring or axle.

In the application illustrated, the unitized dual lip seal 1 is installed in the axle journal by first press fitting the unitized dual lip seal onto the spacer ring 21. This press fit forces the low friction material coating 14 on the peripheral portion 13 of radial flange 12 against the shoulder 6 of the seal case 2. The seal case 2 for the unitized dual lip seal 1 is then press fitted into the double cup 3. Rubbing contact between the low friction material 14 on peripheral portion 13 and shoulder 6 of the seal case 2 will be present until the lateral movement of the wear ring 11 repositions the radial flange 12 with the low friction coating free from the shoulder 6, or until rubbing contact between the low friction material 14 and the shoulder 6 wears the low friction material sufficiently to clear the shoulder 6 of the seal case 2. In other applications, it will be appreciated that the low friction material of wear ring 11 will engage thrust ring 15 pushing the thrust ring against the optionally crimped portion 1a (shown in phantom) of the seal case. In the same manner as noted before, lateral motion of the wear ring 11 will reposition the radial flange 12 so that the low friction coating 14 on the peripheral portion 13 thereof is free of the thrust ring; otherwise the low friction material will engage the thrust ring until it is sufficiently worn to provide clearance.

It will be appreciated that the invention provides a unitized dual lip seal where all internal parts are permanently assemblied and the complete dual lip seal can be treated as a unit. Also, the seal assembly is self-locating during operation, and the seal wear ring will locate in the proper area of the spacer ring by lateral motion of the bearing to prevent rubbing contact. Without lateral motion the low friction coating on the peripheral portion of the radial flange of the seal wear ring will wear sufficiently to prevent rubbing contact. Moreover, it will be appreciated that in other applications the seal case may be modified to be crimped over the thrust ring, thus providing a completely unitized dual lip seal for many applications. Likewise, it will be appreciated that the resilient seal member may have an integral bumper extension for protection of the dust lip seal.

It will be appreciated by those skilled in the art that various changes and modifications will be immediately apparent, and that the invention contemplates such apparent modifications and changes. All such changes and modifications are deemed to be within the scope of the invention which is limited only by the scope of the appended claims.

What is claimed is:

1. A unitized dual lip seal for a rotary shaft comprising a cylindrical seal casing having a central shoulder and having an inwardly directed radial flange, a seal member bonded onto the free end and adjacent surface of the radial flange, said seal member having a pair of diagonally diverging sealing lips projected on opposite sides of said radial flange, a wear member having a cylindrical seal surface for said sealing lips to seat on and having an outwardly directed radial portion extending axially adjacent said central shoulder and spaced from said seal casing, and a thrust ring member having a radial rim and abutting said central shoulder with said radial rim axially spaced from said radial portion, said thrust ring retaining said wear member intermediate said central shoulder and said radial rim.

2. The dual sealing lip of claim 1 wherein the peripheral surface of said radial portion is coated with low friction material.

3. In a railway car axle journal including a bearing assembly having a bearing cup and a bearing cone, a backing ring and a spacer ring press fitted to the axle, a unitized dual lip seal for said axle comprising a cylindrical seal casing having a central shoulder and having an inwardly directed radial flange anchored to said bearing cup, a seal member bonded over the free end of the radial flange, said seal member having a pair of diagonally diverging sealing lips projecting on opposite sides of said radial flange, a wear member press fitted to said spacer ring, said wear member having a cylindrical seal surface for said sealing lips to seat on and having an outwardly directed radial portion extending axially adjacent said central shoulder and spaced from said seal casing, and a thrust ring member having a radial rim spaced adjacent said radial portion, said thrust ring member abutting said central shoulder and retaining said wear member intermediate said central shoulder and said radial rim.

4. The dual lip seal of claim 3 wherein the peripheral surface of said radial portion is coated with low friction material, and wherein a garter spring applies sealing pressure to one of said sealing lips.

5. A unitized dual lip seal for a rotary shaft comprising a cylindrical seal casing having a central shoulder and having an inwardly directed radial flange, a seal member bonded over the free end of the radial flange, said seal member having a pair of diagonally diverging sealing lips projected on opposite sides of said radial flange, a wear member having a cylindrical seal surface for said sealing lips to seat on and having an outwardly directed radial portion extending axially spaced adjacent said central shoulder and spaced from said seal casing, and a thrust ring member having a radial rim and abutting said central shoulder with said radial rim axially spaced from said radial portion, said thrust ring permitting said wear member limited travel between said central shoulder and said radial rim.

6. The dual lip seal of claim 5 wherein the peripheral surface of said radial portion is coated with low friction material.

7. In a railway car axle journal including a bearing assembly having a bearing cup and a bearing cone, a backing ring and a spacer ring press fitted to the axle, a unitized dual lip seal for said axle comprising a cylindrical seal casing having a central shoulder and having an inwardly directed radial flange anchored to said bearing cup, a seal member bonded onto the radial flange, said seal member having an integral fluid sealing lip and an integral dust sealing lip, said fluid sealing lip diagonally diverging within said seal casing from said radial flange and said dust sealing lip diagonally diverging without said seal case from said radial flange, a wear member press fitted to said spacer ring, said wear member having a cylindrical seal surface for said sealing lips to seat on and having an outwardly directed radial portion extending adjacent said central shoulder and spaced from said seal casing, and a thrust ring member having a radial rim spaced adjacent said radial portion, said thrust ring member abutting said central shoulder and retaining said wear member intermediate said central shoulder and said radial rim.

8. The dual lip seal of claim 7 wherein the peripheral surface of said radial portion is coated with low friction material, and wherein a garter spring is provided at the backside of said fluid sealing lip and applies sealing pressure thereto.

References Cited

UNITED STATES PATENTS

| | | | |
|---|---|---|---|
| 2,871,037 | 1/1959 | Johnson et al. | 277—153 |
| 3,021,161 | 2/1962 | Rhoads et al. | 277—153 X |
| 3,099,454 | 7/1963 | Walinski | 277—153 X |

MARTIN P. SCHWADRON, *Primary Examiner.*

R. A. DUA, *Assistant Examiner.*